United States Patent
Kumarahalli Srinivasmurthy et al.

(10) Patent No.: US 9,836,191 B2
(45) Date of Patent: Dec. 5, 2017

(54) DYNAMIC APPLICATION GENERATION FOR A CONTENT FEED

(75) Inventors: Venugopal Kumarahalli Srinivasmurthy, Bangalore (IN); James Allely Rowson, Fremont, CA (US); Loren D. Chapple, Vancouver, WA (US); Ajay Gupta, Vancouver, WA (US); Tuan A. Tran, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 10 days.

(21) Appl. No.: 14/364,761

(22) PCT Filed: Dec. 16, 2011

(86) PCT No.: PCT/US2011/065395
§ 371 (c)(1),
(2), (4) Date: Jun. 12, 2014

(87) PCT Pub. No.: WO2013/089768
PCT Pub. Date: Jun. 20, 2013

(65) Prior Publication Data
US 2014/0368880 A1    Dec. 18, 2014

(51) Int. Cl.
*G06F 3/12* (2006.01)
*G06F 3/0484* (2013.01)
*G06F 9/44* (2006.01)
*H04L 12/18* (2006.01)

(52) U.S. Cl.
CPC ............ *G06F 3/0484* (2013.01); *G06F 3/126* (2013.01); *G06F 3/1286* (2013.01); *G06F 8/38* (2013.01); *H04L 12/1813* (2013.01)

(58) Field of Classification Search
CPC ............... G06Q 50/10; H04N 1/00244; H04N 1/00278; H04N 1/32502; H04N 1/32771; H04N 2201/0039; H04N 1/2201
USPC .......................................... 709/226; 715/205
See application file for complete search history.

(56) References Cited

U.S. PATENT DOCUMENTS

| | | | |
|---|---|---|---|
| 2007/0038934 A1 | 2/2007 | Fellman | |
| 2008/0034309 A1 | 2/2008 | Louch et al. | |
| 2008/0046459 A1* | 2/2008 | Hinohara | H04N 1/00127 |
| 2009/0193393 A1 | 7/2009 | Baldwin et al. | |

(Continued)

FOREIGN PATENT DOCUMENTS

JP    2006318286 A    11/2006

OTHER PUBLICATIONS

International Search Report & Written Opinion received in PCT Application No. PCT/US2011/065395, Aug. 17, 2012, 9 pages.

(Continued)

*Primary Examiner* — Henok A Shiferaw
(74) *Attorney, Agent, or Firm* — HP Inc. Patent Department

(57) ABSTRACT

A system receives an indication of a content feed of hierarchical content over a network. The content feed is hosted by a content provider. The system dynamically instantiates a content connection application that incorporates the content feed using a pre-defined declarative data structure engine. The system provides a user interface widget for the content connection application to allow user interaction with the hierarchical content of the first content feed.

15 Claims, 3 Drawing Sheets

(56) References Cited

U.S. PATENT DOCUMENTS

| | | | |
|---|---|---|---|
| 2009/0249359 A1* | 10/2009 | Caunter | G06F 9/4448 719/315 |
| 2009/0316198 A1* | 12/2009 | Takeuchi | H04L 67/22 358/1.15 |
| 2010/0011338 A1 | 1/2010 | Lewis | |
| 2010/0162274 A1 | 6/2010 | Gangadharappa | |
| 2010/0185765 A1* | 7/2010 | Kang | H04L 12/2812 709/226 |
| 2012/0290908 A1* | 11/2012 | Kumar | G06F 17/30893 715/205 |

OTHER PUBLICATIONS

European Patent Office. Extended European Search Report. dated Jul. 30, 2015. Application No. 11877362.1.

* cited by examiner

DYNAMIC APPLICATION GENERATION FOR A CONTENT FEED

BACKGROUND

With the growth of Internet content and services, Internet applications are becoming increasingly popular. Application software, commonly referred to as an application or simply an "app," is designed to allow a user to perform a singular or multiple related specific tasks, often leveraging Internet connectivity. Such "apps" are designed for a variety of web-connected devices, including mobile devices, desktop computers, notebooks, and the like.

BRIEF DESCRIPTION OF DRAWINGS

The following description includes discussion of figures having illustrations given by way of example of implementations of embodiments of the invention. The drawings should be understood by way of example, not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

Described herein are embodiments for dynamically generating software applications from content feeds. These software applications may include, but are not limited to, mobile device apps, peripheral device apps (including printing apps), web-apps, and other application widgets for interacting with remote content (e.g., available via the Internet). As used herein, applications that connect users to content associated with respective content feeds are referred to as content connection apps or applications. As used herein, a content feed refers to a web feed from a content provider. These feeds, also known as syndicated feeds, typically contain frequently updated content. While delivery formats and protocols may vary, web feeds are typically delivered as XML (eXtensible Markup Language).

Apps are often individually programmed (e.g., using Java, .NET. Python, etc.) to satisfy API (Application Programming Interface) requirements of a service provider or a service provider platform. For example, a service provider may provide a set of services such as authentication, security, display control, etc. via one or more APIs. Thus, in developing applications for compatibility with the service provider platform, computer programmers write code that adheres to the rules and specifications of the various applicable APIs. While certain parts of programming code may be leveraged from one application to another, each application supported by a service provider platform typically has unique standalone programming code for running the application.

Rather than rely an Individual standalone applications, embodiments described herein leverage hierarchical patterns in content browsing to dynamically instantiate applications from content feeds using a generic application generation engine. In particular, it has been observed that many content providers have content repositories which have a folder-like organization. For example, Disney content might be organized around favorite characters white Sudoku content might be organized around difficulty. In these and other cases, the content provider expects the user to navigate a hierarchical structure to reach consumable content (e.g., printable content, content for display, interaction, etc.). Embodiments described herein exploit this hierarchical structure using a semantic language (e.g., XML or extensible Markup Language) description to declare the content tree. The semantic language description is incorporated into a pre-defined declarative data structure engine or semantic language processor that accepts a content feed link (e.g., in the form of a URL or Uniform Resource Locator) as an input argument. Given an indication of the content feed, the engine dynamically instantiates an individual application specific to the content feed and provides a unique application UI (user interface) for traversing content based on metadata for the content feed.

Figure 1:
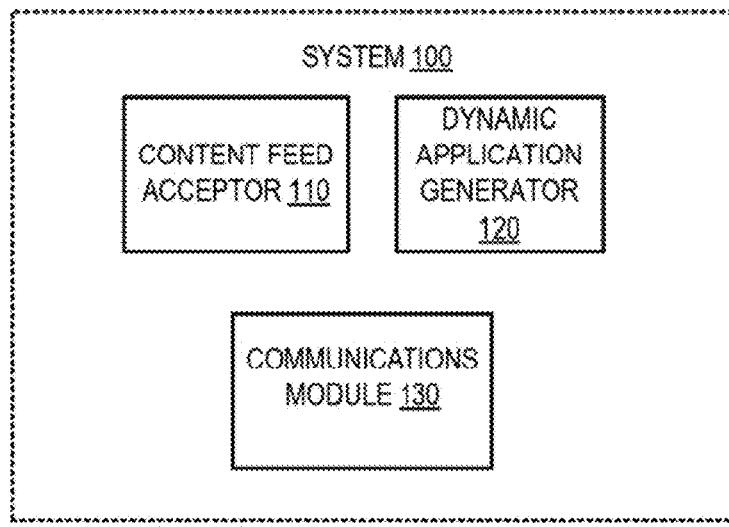
FIG. 1 is a block diagram illustrating a system according to various embodiments.

FIG. 1 is a block diagram illustrating a system according to various embodiments. As shown by the dotted line, the components, modules, etc. of System 100 may be incorporated into a single physical device or they may be distributed across multiple physical devices, for example, over a network. Content feed acceptor 110 receives an indication (e.g., a feed link or URL or both) of content feeds from different content providers over a network. Content associated with each content feed is structured as a hierarchy tree, where each intermediate node reflects a category of content—similar to a folder—and each leaf node represents consumable (e.g., printable, displayable, etc.) content.

Dynamic application generator 120 instantiates a unique executable application for each content feed based on its respective feed link. For example, the feed link may contain or point to metadata and/or content configuration source information in semantic format (e.g., XML or other suitable format) for the hierarchical content in the content feed. In various embodiments, dynamic application generator 120 is implemented in Java (available from Oracle Corporation of Santa Clara, Calif.) code though any suitable programming language could be used (e.g., .NET, Python, etc.). It should be noted that content feed indications may be recursive. In other words, a feed link may reference one or more nested feed links.

Once an application is instantiated by dynamic application generator 120, communications module 130 provides the instantiation of the application to an end-user device (e.g., peripheral device, mobile computing device, etc.). In various embodiments, the application includes a user interface that allows a user operating the end-user device to interact with the hierarchical content associated with the content feed.

Figure 2:
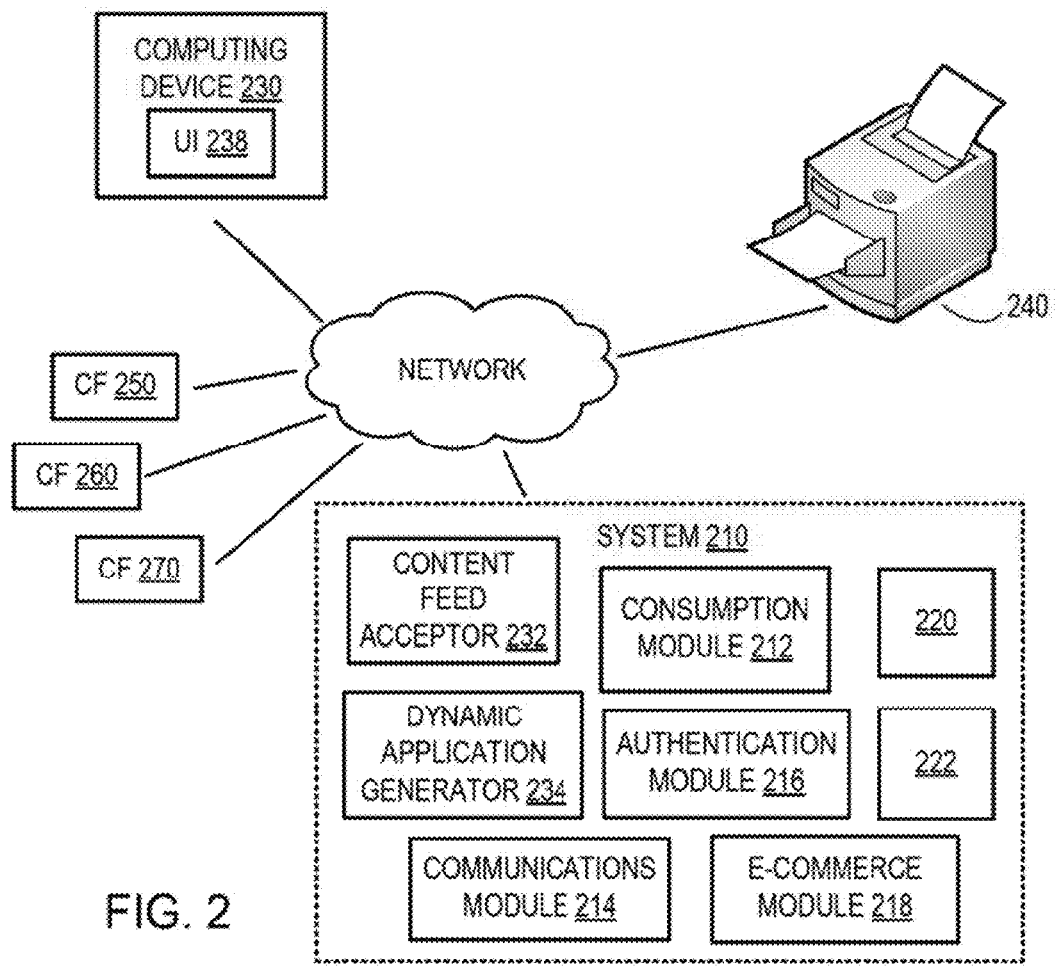
FIG. 2 is a block diagram illustrating a system according to various embodiments.

FIG. 2 is a block diagram illustrating a system according to various embodiments. FIG. 2 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these. Various modules and/or components illustrated in FIG. 2 may be implemented as a non-transitory computer-readable storage medium containing instructions executed by a processor (e.g., processor 220) and stored in a memory (e.g., memory 222) for performing the operations and functions discussed herein.

In the example illustrated in FIG. 2, the modules and components of system 210 may be integrated into a single physical computing device or they may be physically distributed among multiple computing devices connected, for example, over a network. In particular, content feed acceptor 232 and dynamic application generator 234 may reside on a user device (e.g., computing device 230, printer 240, or other suitable computing device for running content connection applications). In some embodiments, dynamic application generator 234 is implemented using Javascript or other suitable scripting language capable of executing on a web browser or application runtime environment (e.g., Adobe Flash, AIR, etc.) of any device. However, dynamic application generator 234 could also be implemented as a standalone program (e.g., Java, .NET, Python, etc.).

Content feed acceptor 232 receives an indication (e.g., a feed link or URL) of hierarchical content feeds (e.g., content feeds 250, 280, 270) from different content providers over a network. The feed link may contain (or point to) metadata and/or content configuration source information in semantic format (e.g., XML or other suitable format) for the hierarchical content associated with the content feed. Content for the content feed tree hierarchy is structured such that each intermediate node reflects a category of content and each leaf node represents consumable (e.g., printable, displayable, etc.) content. Accordingly, dynamic application generator 234 instantiates a unique executable application for each content feed based on its respective feed link and/or other metadata for the content feed.

Once a content connection application for a content feed has been instantiated, dynamic application generator 234 provides the root node of the content tree to UI 238. User selection of the root node initiates execution of the application. The user interface (UI) 238 can run on a device platform (e.g., platform of device 230, printer 240 or other suitable device) or it could run on a web browser operable on the device. User selection of a root node for an application via UI 238 allows the user to interact with the hierarchical content tree associated with the respective content feed. Each intermediate node of the content tree reflects a category of content and each leaf node represents consumable content and/or an action. As described above, consumable content can be content for printing, display/presentation, user interaction or other form of content consumption. Actions might include changing a device setting (e.g., printer setting), generating a print preview, etc.

Figure 3:
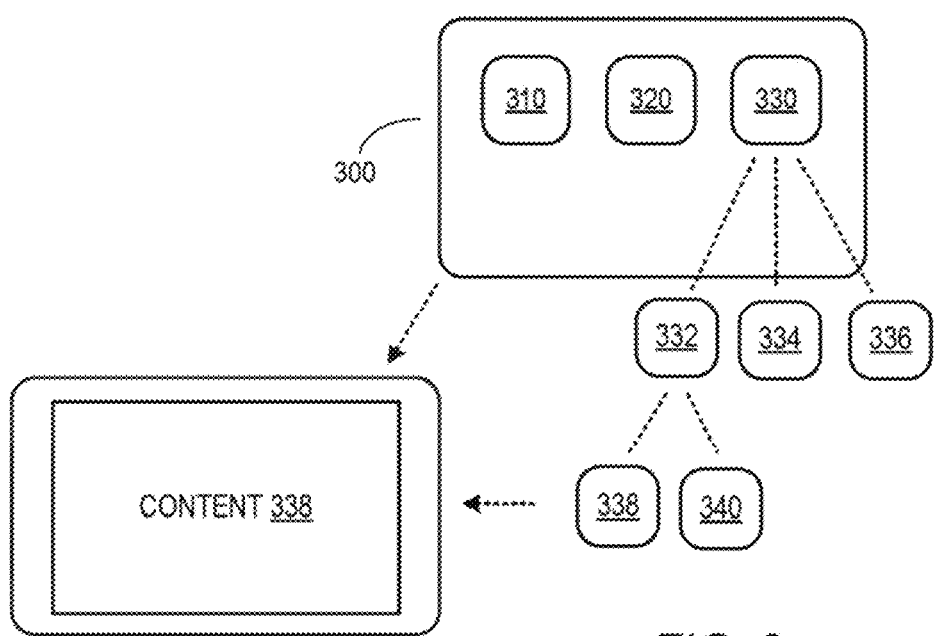
FIG. 3 is a block diagram illustrating a user interface according to various embodiments.

FIG. 3 illustrates an example of a user interface 300 for interacting with hierarchical content for applications generated by a dynamic application generator (e.g., 120, 234, etc.). In this example, UI 300 is a touch UI; however, any suitable UI could be used in the alternative. As shown, UI 300 contains three end-user applications (310, 320, and 330), each representing a root node of a content tree for a given content feed. When user selects, for example, "sports" application 330, intermediate nodes 332, 334, and 336 are presented to the user. By selecting "basketball" node 332, the user is further presented with content nodes 338 and 340. In various embodiments, selecting content node 338 causes UI 300 to display the content associated with content node 338 (e.g., an image of a basketball player). In other embodiments, selecting content node 338 may generate a request for action to be taken on the content associated with content node 338. For example, selecting content node 338 may cause a print request to be generated for the content (which could be processed on the device containing UI 300 if a printer or sent to a printing device if a non-printing device).

While nodes of a content tree may be presented as selectable (e.g., via touch, mouse clicking, etc.) buttons as shown in FIG. 3, other forms of displaying content nodes could also be used. For example, if UI 300 is a touch screen interface, nodes at each level of the content tree might be displayed one at a time on UI 300, perhaps consuming the full UI display. Switching between nodes on the same hierarchy level might be accomplished by a swiping gesture or other touch-related gesture. A selection gesture (e.g., tapping on a touch screen) then moves the user to a different level of the content tree. Other suitable interaction schemes for interacting with the content tree via a user interface could also be used.

Referring back to FIG. 2, in some embodiments, dynamic application generator 234 incorporates an authentication script into a content connection application. An authentication module 216 receives authentication information provided by a user in response to execution of the authentication script. For example, the authentication script may be tied to a particular node in the content tree such that access to the node and/or its child nodes requires authentication. When the user selects an authentication node (which could be the root node), the authentication script is launched, soliciting authentication information from the user (e.g., password, token, etc.). Authentication information is passed to authentication module 218. Authentication module 216 determines the validity of the authentication information to control access to the authentication node and/or its child nodes.

In some embodiments, dynamic application generator 234 incorporates an e-commerce script into a content connection application. Similar to the authentication script, the e-commerce script may be associated with a particular node in the content tree such that access to the node and/or its child nodes requires an e-commerce transaction. Accordingly, when a user selects an e-commerce node in an application (which could be the root node), the e-commerce script is launched, soliciting payment information and/or authorization from the user. For example, the e-commerce script might request payment information (e.g. credit card information, bank account information, etc.). Or, if the application is hosted by a service platform (e.g., ePrint Center available from Hewlett Packard Company of Palo Alto, Calif.) to which the user is registered, the user may have payment information on file with his/her user account information. In such cases, the e-commerce script may simply query the user as to whether the user authorizes charging of his/her account on file. An e-commerce module 218 receives the e-commerce information provided by the user and controls access to the e-commerce node accordingly. For example, e-commerce module 218 may take received credit card information and contact the corresponding bank for authorization to charge the user's credit card account.

In various embodiments, communications module 214 receives an indication of a user traversing a content tree for an application to reach a leaf node. In response, a consumption module 212 obtains the content for the leaf node (e.g., by accessing a URL for the leaf node content, or receiving the content directly from the user device with which the user has traversed the content tree, etc.) and renders the content for consumption by a consuming device (e.g., printer, display device, etc.). In the case of a printing device, consumption module 212 renders the content into a print-ready format. Alternatively, the consuming device could be a display device, in which case consumption module 212 might render the content into a desired or optimal format for the particular display device. Once the content is rendered, communications module 214 provides the rendered content over a network to a device associated with the user. For example, if the user of the application is registered with the application service platform (e.g., ePrint Center), the user might have one or more devices (e.g., printers, mobile computing devices, video display devices, etc.) registered/associated with the user's account. Thus, when a user generates a content consumption request, content consumption module 212 might determine a preferred (e.g., registered) device for sending the content based on the type of request. In some embodiments, the user might specify a particular network-connected device or email address or other mechanism for receiving the content associated with a consumption request.

In certain embodiments, dynamic application generator 234 incorporates a printing script into a content connection application. Similar to the other scripts described herein, the printing script may be associated with a particular node in the content tree. In particular, the printing script may be associated with a leaf node in the content tree. When the user traverses to such a node, the printing script is launched, allowing the user to input certain information about the print job he/she desires to generate. For example, the printing script might allow the user to specify options and parameters such a paper size, color, quality, or other variable options associated with a typical print job. If the application is hosted by by a service platform (e.g., ePrint Center) to which the user is registered, the printing script may allow the user to specify a particular print registered with the service platform for handling the print request.

Figure 4:
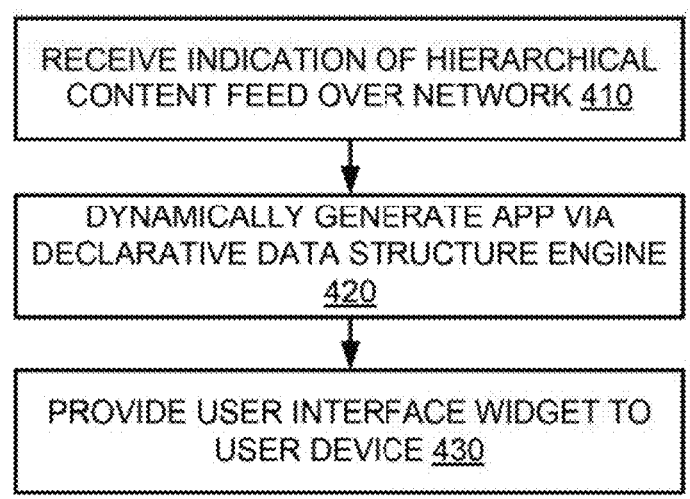
FIG. 4 is a flow diagram of operation in a system according to various embodiments.

FIG. 4 is a low diagram of operation in a system according to various embodiments. FIG. 4 includes particular operations and execution order according to certain embodiments. However, in different embodiments, other operations, omitting one or more of the depicted operations, and/or proceeding in other orders of execution may also be used according to teachings described herein.

A system receives 410 indications of content feeds of hierarchical content hosted by various content providers. The indications may be descriptions of the respective content feeds (e.g. an XML description file or other metadata) and/or they may be feed links (e.g., URL) for the respective content feeds. In response to such an indication, the system dynamically generates 420 a content connection application via an instance of a pre-defined declarative data structure engine that incorporates the respective content feed. In various embodiments, the pre-defined data structure is a tree hierarchy. The data structure is declared using a semantic language (e.g., XML) and uses the content feed information (e.g., XML description, feed link, etc.) to instantiate a unique content connection application for the content feed. The same pre-defined declarative data structure engine instantiates unique content connection applications each time a new and different indication of a content feed is received.

The system provides 430 a user interface widget for each instantiated content connection application. In embodiments where the declarative data structure engine operates in the cloud (e.g., on a remote server), the user interface widget is provided over a network (e.g., the Internet) to a user device (e.g., mobile device, desktop computer, tablet, notebook, network-connected printer, etc.). However, the declarative data structure engine could also operate directly on a user device and provide the user interface widget directly to either a web browser or to another device platform hosting the content connection application.

Various modifications may be made to the disclosed embodiments and implementations of the invention without departing from their scope. Therefore, the illustrations and examples herein should be construed in an illustrative, and not a restrictive sense.

What is claimed is:

1. A non-transitory computer-readable storage medium containing instructions that, when executed, cause a user computer to:
   receive an indication of a first content feed of content hosted by a first content provider and accessible via a network, wherein the content of the first content feed is organized in a hierarchical structure having intermediate nodes representing categories of the content and leaf nodes representing printable content;
   use the hierarchical structure of the content hosted by the first content provider to execute a first content connection application at the user computer to generate first user interface widgets that represent the categories of the first content feed based on first metadata of the first content feed, wherein the first user interface widgets are generated by the first content connection application at the user computer and are not generated by the first content provider;
   in response to a selection of one of the first user interface widgets corresponding to one of the categories, generate second user interface widgets that represent the printable content of the selected category based on second metadata of the first content feed, wherein the second user interface widgets are generated by the user computer and not by the first content provider;
   in response to a selection of one of the second user interface widgets, display the printable content of the first content feed corresponding to the selected user interface widget; and
   in response to a selection of the displayed printable content, cause the displayed printable content to be printed by a printer.

2. The non-transitory computer-readable storage medium of claim 1, comprising further instructions that cause the computer to:
   receive an indication of a second content feed of content having a hierarchical structure hosted by a second content provider and accessible via the network;
   dynamically generate a second content connection application for the content of the second content feed using the hierarchical structure of the content of the second content feed; and
   provide user interface widgets for the second content connection application corresponding to nodes in the hierarchical structure of the content of the second content feed to allow user interaction with the content of the second content feed.

3. The non-transitory computer-readable storage medium of claim 1, further comprising instructions that, when executed, cause the computer to:
   provide an authentication script within the first user interface widgets to control access to at least a portion of the content of the first content feed.

4. The non-transitory computer-readable storage medium of claim 1, further comprising instructions that, when executed, cause the computer to:
provide an e-commerce script within the first user interface widgets to control access to at least a portion of the content of the first content feed.

5. The non-transitory computer-readable storage medium of claim 1, further comprising instructions that, when executed, cause the computer to:
traverse the hierarchical structure of the content in response to user input to generate a print job.

6. The non-transitory computer-readable storage medium of claim 5, further comprising instructions that, when executed, cause the computer to:
provide a printing script to control execution behavior of the print job.

7. The non-transitory computer-readable storage medium of claim 1, further comprising instructions that, when executed, cause the computer to:
traverse the hierarchical structure of the content in response to user input to generate a print setting for a printing device.

8. A system, comprising:
a processor; and
a memory storing instructions that when executed cause the processor to:
receive a content feed of content from a first content provider over a network, wherein the content of the content feed is organized in a hierarchical structure having intermediate nodes corresponding to categories of the content and leaf nodes representing printable content;
execute an end-user application to generate first user-interface widgets corresponding to the categories of the content feed based on first metadata of the content feed, wherein the first user-interface widgets are generated by the end-user application at the user computer and are not generated by the first content provider;
in response to a selection of one of the first user interface widgets corresponding to one of the categories, generate second user interface widgets corresponding to the printable content of the selected category based on second metadata of the content feed, wherein the second user interface widgets are generated by the user computer and not by the first content provider;
in response to a selection of one of the second user-interface widgets, display the printable content of the content feed corresponding to the selected user-interface widget; and
in response to a selection of the displayed printable content, cause the displayed printable content to be printed by a printer.

9. The system of claim 8, wherein the instructions are further to cause the processor to:
incorporate an authentication script into an instantiation of one of the first end-user widgets; and
receive authentication information provided by a user in response to execution of the authentication script and control access to at least a portion of the content in a content feed based at least in part on the authentication information provided by the user.

10. The system of claim 8, wherein the instructions are further to cause the processor to:
incorporate an e-commerce script into an instantiation of one of the first end-user widgets; and
control access to at least a portion of the content in a content feed based at least in part on the e-commerce information provided by the user.

11. The system of claim 8, wherein the instructions are further to cause the processor to:
receive an indication of a user traversing, via one of the first end-user widgets, the hierarchical structure of the content associated with one of the content feeds to reach a leaf node of the content;
render content associated with the leaf node for user consumption; and
provide the rendered content over the network to a device associated with the user.

12. The system of claim 11, wherein the user consumption comprises printing and wherein the device associated with the user comprises a network-connected printer.

13. The system of claim 12, wherein the instructions are further to cause the processor to:
incorporate a printing script into an instantiation of one of the first end-user widgets; and
render content in view of information provided by the user as a result of executing of the printing script.

14. A method comprising:
receiving, by a processor of a user computer, an indication of a first content feed of content hosted by a first content provider and accessible via a network, wherein the content of the first content feed is organized in a hierarchical structure having intermediate nodes representing categories of the content and leaf nodes representing printable content;
executing, by the processor, a first content connection application at the user computer to generate first user interface widgets that represent the categories of the first content feed based on first metadata of the first content feed, wherein the first user interface widgets are generated by the first content connection application at the user computer and not by the first content provider;
in response to a selection of one of the first user interface widgets corresponding to one of the categories, generating second user interface widgets that represent the printable content of the selected category based on second metadata of the first content feed, wherein the second user interface widgets are generated by the user computer and not by the first content provider;
in response to a selection of one of the second user interface widgets, displaying, by the processor, the printable content of the first content feed corresponding to the selected user interface widget; and
in response to a selection of the displayed printable content, causing the displayed printable content to be printed by a printer.

15. The method of claim 14, further comprising:
receiving an indication of a second content feed of content having a hierarchical structure hosted by a second content provider and accessible via the network;
dynamically generating a second content connection application for the content of the second content feed using the hierarchical structure of the content of the second content feed; and
providing user interface widgets for the second content connection application corresponding to nodes in the hierarchical structure of the content of the second content feed to allow user interaction with the content of the second content feed.

* * * * *